Aug. 9, 1927.
F. LOBE
FRICTION COUPLING
Filed Dec. 23, 1926
1,638,773
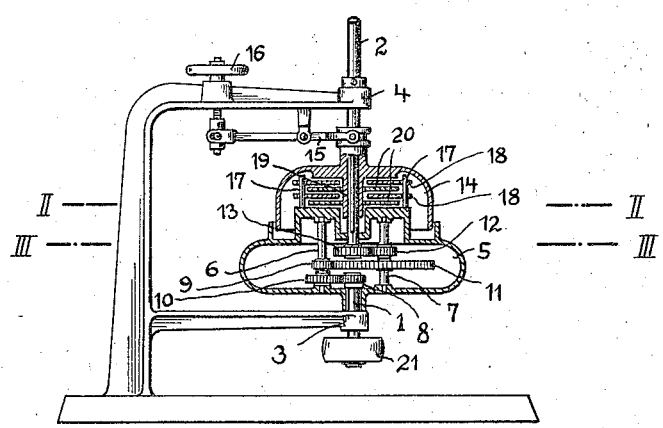
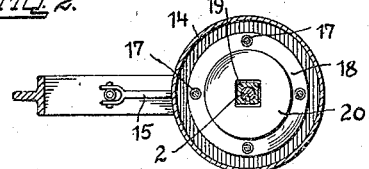
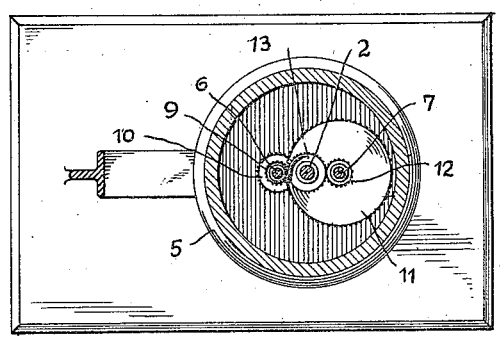

Patented Aug. 9, 1927.

1,638,773

UNITED STATES PATENT OFFICE.

FRITZ LOBE, OF BRESLAU, GERMANY.

FRICTION COUPLING.

Application filed December 23, 1926. Serial No. 156,734.

This invention relates to a friction coupling, by which a stationary shaft has to be gradually brought, from a driving shaft revolving at high speed, from the state of rest to the speed at which the driving shaft revolves, this being effected without the intermediary of transmission gears successively to be engaged, and without wearing of the coupling elements. This coupling is designed for instance for the starting of centrifuges from a shaft revolving at great speed or for the starting of motor cars.

The improved coupling is shown, by way of example, in the accompanying drawing in which:

Fig. 1 is a vertical section.

Fig. 2 is a section on line II—II of Fig. 1, viewed from below.

Fig. 3 is a section on line III—III of Fig. 1, viewed from above.

1 is the driving shaft, which is revolving at high speed, and 2 is the driven shaft designed to be gradually brought from the 0 speed to the speed of the driving shaft 1. The driving shaft 1 is journalled in a bearing 3 and the driven shaft 2 is journalled in a bearing 4. A housing 5 is mounted on the driving shaft 1 so that it can freely rotate around the same. In this housing two auxiliary shafts 6 and 7 are journalled.

On the driving shaft 1 a spur wheel 8 is keyed. On the auxiliary shaft 6 two spur wheels 9 and 10 are keyed, and two spur wheels 11 and 12 are keyed on the auxiliary shaft 7, a spur wheel 13 being keyed on the driven shaft 2. The spur wheel 8 co-operates with the spur wheel 10, and the spur wheel 9 with the spur wheel 11 and the spur wheel 12 with the spur wheel 13. The diameters of the spur wheels are selected so that at a rapid revolving movement of shaft 1 a transmission into slow speed takes place up to the toothed wheel 12. Suppose the shaft 2 be at rest and the shaft 1 revolved at high speed. The spur wheel 12 will then rotate slowly around the spur wheel 13 which is at rest, whereby the housing 5 is made to rotate at the same slow speed around the shaft 1.

On the shaft 2 a casing 14 is mounted shiftable in axial direction and prevented from rotating on shaft 2 by means of a key and and groove connection. The shifting of casing 14 on the shaft 2 can be controlled by a hand wheel 16 by means of a disengaging fork 15. The hub 19 of casing 14 is of square cross section and on this hub friction disks 20 are loosely mounted which have each a square central aperture so that said friction disks 20 are capable to be shifted in the axial direction on hub 19, being however secured against rotation on this hub.

On the housing 5 vertical bolts 17 are fixed on which friction disks 18 are loosely mounted so that they can be freely shifted on the bolts in axial direction being however secured against rotation with regard to the housing 5. The friction disks 18 and 20 are alternately arranged so that between every two disks 18 one disk 20 is situated.

The operation of the mechanism is as follows:—

If the driven shaft 2 is at rest and the coupling is disengaged by the hand wheel 16 so that the friction disks 18 and 20 stand loosely the one at the side of the other, the toothed wheel 13 of shaft 2 is also at rest and the shaft 1, driven at high speed from the engine by the disk 21, drives the spur wheel 12 through the transmission gear 8, 10, 9 and 11, said spur wheel 12 rotating at a very low speed around the stationary spur wheel 13. The housing 5 is consequently slowly rotated with regard to the stationary casing 14 and in the same direction in which shaft 1 revolves. The friction disks 20 of the casing 14 are still stationary, whilst the friction disks 18 of housing 9 rotate slowly between the friction disks 20. When, by the hand wheel 16 and by the disengaging fork 15 the casing 14 is shifted on shaft 2 towards the housing 5, the friction disks 18 and 20 are pressed on one another, whereby friction is produced between these disks. When the friction becomes so great that the shaft 2 is rotated it will be rotated at first at the same slow speed at which the housing 5 rotates. At this occasion the spur wheel 13 is rotated also. As the revolving speed of the driving shaft 1 remains the same, the revolving speed of the housing 5 will be increased by the rotating spur wheel 13 so that, when the coupling is further engaged, the rotating speed of the spur wheel 13 is increased again without any mutual shifting of the friction disks 20 and 18 worth mentioning, so that almost no wearing of the friction disks can take place. This mutual action continues until the casing 14 is rigidly coupled with the housing 5 by the friction disks 18 and 20 and the driving shaft 2 revolves at the same revolving speed as shaft 1.

I claim:—

A friction coupling for revolving a shaft at rest, from a driving shaft which revolves at high speed, gradually from the zero speed to the speed of the driving shaft, a housing loosely mounted on said driving shaft, two auxiliary vertical shafts in said housing, a spur wheel keyed on said driving shaft, two transmission spur wheels keyed on one of said auxiliary shafts, two transmission spur wheels keyed on said second mentioned auxiliary shaft, a spur wheel keyed on said driven shaft all these spur wheels being located in said housing and being of different diameters so that at high speed revolving of said driving shaft the upper spur wheel on said auxiliary shafts rotates slowly around said spur wheel keyed on said driven shaft and said housing is slowly rotated on said driving shaft, a casing shiftably mounted on said driven shaft, friction disks shiftably mounted on the hub of said casing, bolts upwardly directed from said housing, and friction disks loosely mounted on said bolts and located one between every two friction disks of said casing for gradually coupling said casing with said housing and consequently said driven shaft with said driving shaft.

In testimony whereof I affix my signature.

FRITZ LOBE.